United States Patent [19]

Nakamura et al.

[11] 4,384,972

[45] May 24, 1983

[54] FOODSTUFF FRESHNESS KEEPING AGENTS

[75] Inventors: Hachiro Nakamura, Ichikawa; Kiyotaka Omote, Tokyo, both of Japan

[73] Assignee: Toppan Printing Co., Ltd., Japan

[21] Appl. No.: 915,871

[22] Filed: Jun. 15, 1978

[30] Foreign Application Priority Data

| Jun. 21, 1977 | [JP] | Japan | 52/73696 |
| Jul. 13, 1977 | [JP] | Japan | 52/83987 |
| Oct. 26, 1977 | [JP] | Japan | 52/128533 |
| Apr. 4, 1978 | [JP] | Japan | 53/39481 |

[51] Int. Cl.$^3$ .................................. C09K 3/00
[52] U.S. Cl. .................. 252/188.21; 426/118; 426/124; 422/40; 55/387; 55/389; 252/188.28; 252/400 R; 252/407
[58] Field of Search .......... 252/188, 397, 407, 455 R, 252/455.2, 446, 400 R, 188.21, 188.28; 426/118, 124, 331, 324, 398, 419; 55/31, 33, 387, 389; 422/4, 40

[56] References Cited

U.S. PATENT DOCUMENTS

| 1,315,163 | 9/1919 | Schwartz | 55/387 |
| 2,825,651 | 3/1968 | Loo et al. | 99/171 |
| 3,313,631 | 4/1967 | Jensen | 426/419 |
| 3,361,531 | 1/1968 | Erb | 23/204 |
| 3,404,987 | 10/1968 | Kooistra et al. | 99/150 |
| 3,761,289 | 9/1973 | Wolf | 426/118 |
| 3,958,028 | 5/1976 | Burg | 426/419 X |
| 4,079,152 | 3/1978 | Bedrosian et al. | 426/124 |
| 4,093,703 | 6/1978 | Buechner et al. | 423/245 |
| 4,113,652 | 9/1978 | Yoshikawa et al. | 252/188 |

FOREIGN PATENT DOCUMENTS

| 674115 | 4/1939 | Fed. Rep. of Germany . |
| 1267525 | 5/1968 | Fed. Rep. of Germany . |
| 1109499 | 10/1980 | Fed. Rep. of Germany . |
| 49-66433 | 6/1974 | Japan | 426/124 |
| 496935 | 12/1938 | United Kingdom . |
| 1069929 | 5/1967 | United Kingdom . |
| 1242412 | 8/1971 | United Kingdom | 426/419 |

OTHER PUBLICATIONS

Condensed Chemical Dictionary, 8th Ed., 1971, Chawlet, Van Nostrand.

*Primary Examiner*—J. L. Barr
*Attorney, Agent, or Firm*—Bacon & Thomas

[57] ABSTRACT

Foodstuff freshness keeping agent comprising a particulate composition which contains a salt of manganese (II), iron (II), cobalt (II) or nickel (II), an alkali compound and a sulfite or a deliquescent substance, and optionally ascorbic acid or its salt, thereby to absorb oxygen in the interior of package of foodstuffs and/or generate therein carbon dioxide gas.

10 Claims, No Drawings

FOODSTUFF FRESHNESS KEEPING AGENTS

This invention relates to a foodstuff freshness keeping agent, and more particularly to a foodstuff freshness keeping agent which when placed in a package of foodstuff are capable of therein absorbing oxygen and/or generating carbon dioxide gas thereby inhibiting deterioration of the foodstuff.

Almost all kinds of foodstuffs are susceptible of deterioration due to oxidation by the ambient oxygen, and vegetables are likely to be wilted up by the respiratory action which takes place during storage. The ambient oxygen may proliferate microorganisms and vitalize insects.

To preserve foodstuffs by inhibiting quality deterioration thereof due to oxidation, there have been known techniques of vacuum or gas substitution packaging, addition of an antioxidant, antiseptic or any other like additives, and incorporation of a deoxgenating agent in foodstuff packages for eliminating oxygen therein.

Package interiors are evacuated, according to the vacuum or gas substitution packaging method, for preserving foodstuffs therein. Nitrogen or carbon dioxide gas is sealed in the evacuated package interiors according to the latter method. These methods have the disadvantage that an exact selection of combinations of articles to be packaged, gas substitution rate and packaging material is required to achieve the intended results. Selection of favorable conditions for the methods demands a tremendous amount of time and data, and use of a high-efficiency packaging machine and a highly gas-impervious packaging material is called for in addition. The vacuum packaging method can only be used for particular foodstuffs because packages are likely to be deformed in the negatively pressurized interior of packages.

Addition of an antioxidant, antiseptic or any other like additives to foodstuffs, which has been extensively adopted for the purpose of preservation, has the disadvantage that a technically sufficient amount of additives is prohibited by various statutes and regulations concerning the foodstuff additives. An increased number of additives have recently been totally prohibited from application to foodstuffs in the light of bad influences on the human body.

The method for eliminating oxygen in foodstuff packages by action of a deoxygenating agent has been proposed in a number of modes in these days.

Oxygen is absorbed, in one of the modes of the method, by adding water to a mixture of glucose and glucose oxidase. The deoxygenating agent requires addition of water from outside thereof for its action, and therefore can not be effectively used for low-water content foodstuffs although it may effectively perform an oxygen-absorbing reaction in use with the foodstuffs containing a great amount of water.

Another mode of the oxygen eliminating method has been known in which foodstuffs are packaged in a material of a polyester/metal foil/surlyn/palladium/Surlyn (trade mark of ionomer by Du Pont Co.) laminated structure by gas substitution with a mixture gas of hydrogen and nitrogen whereby oxygen remaining in the package is reacted with the hydrogen under the catalytic action of palladium in the laminated structure to permit elimination of oxygen. Specifically, oxygen remaining in about 2% in the interior of the package after having been gas-substituted in a gas flash manner is reacted with hydrogen into water under the catalytic action of palladium at a normal temperature. The drawbacks of this method have obviously resided in requiring use of the special laminated structure material provided with expensive palladium as a lamina, and burdensome operation of gas substitution with a hydrogen and nitrogen mixture gas. An improved method is disclosed in U.S. Pat. No. 3,419,400 in which the hydrogen gas with which the package interior is gas-substituted is replaced by a hydride of magnesium, lithium or other like metal which can generate hydrogen upon reaction with water. The disclosed method still requires use of expensive palladium and was not found in use for low-water content foodstuffs to permit hydrogen to be generated in an amount enough to warrant a practical application to preserve such types of foodstuffs.

A deoxygenating composition has been known which majorly consists of sodium hydrosulfite and calcium hydroxide, and upon addition of a catalyst, water and activated charcoal performs an oxygen absorbing reaction expressed in the following formula:

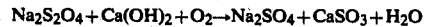

$$Na_2S_2O_4 + Ca(OH)_2 + O_2 \rightarrow Na_2SO_4 + CaSO_3 + H_2O$$

Although being capable of eliminating oxygen in a relatively high efficiency, the deoxygenating composition requires addition of water from outside thereof as a catalyst for such a reaction. Moreover, heat and sulfite gas generated upon the reaction undesirably has an adverse effect on quality and taste of the foodstuffs thus preserved.

A further example of the known deoxygenating compositions is disclosed in U.S. Pat. No. 2,825,651 which is an intimate mixture of a sulfite and a compound capable of releasing metallic ions which are reactive towards said sulfite.

One object of the invention is to provide a foodstuff freshness keeping agent which can be applied to all kinds of foodstuffs at a low cost and in a facilitated manner.

Another object of the invention to provide a foodstuff freshness keeping agent which are capable of reacting on and absorbing oxygen without requiring addition of hydrogen gas or water from outside.

There is provided according to the invention a foodstuff freshness keeping agent comprising a particulate composition essentially consisting of a sulfate or a chloride of manganese(II), iron(II), cobalt(II) or nickel(II), an alkali compound selected from the group of hydroxide, carbonate and bicarbonate, and a sulfite and deliquescent substance.

A sulfate or a chloride or manganese(II), iron(II), cobalt(II) or nickel(II) herein contained may be substituted in part by ascorbic acid or its salt.

Preferably, the composition further comprises powder of iron or other metal added therein which presents an enhanced absorbability of oxygen.

Also preferably, the composition contains a carbonate or a bicarbonate as an alkali compound so that it can not only absorb oxygen, but generate carbon dioxide gas at the same time.

Examples of the sulfate and chloride to be contained in the composition of the invention are manganese(II) sulfate, iron(II) sulfate, cobalt(II) sulfate, nickel(II) sulfate, manganese(II) chloride, iron(II) chloride, cobalt(II) chloride, and nickel(II) chloride. Either a hydrate or an anhydrous form thereof may be used. Hydrates of iron(II) sulfate, iron(II) chloride and manganese(II) sulfate are preferred to the rest of the above examples.

Typical examples of ascorbic acid and its salt are L-ascorbic acid, sodium L-ascorbate, D-iso-ascorbic acid, and sodium D-iso-ascorbate.

The alkali compound to be contained in the composition may be a hydroxide such as sodium hydroxide, potassium hydroxide, magnesium hydroxide, calcium hydroxide zinc hydroxide and aluminum hydroxide, a carbonate such as sodium carbonate, and a bicarbonate such as sodium bicarbonate. When a carbonate and/or a bicarbonate are contained in the freshness keeping agent, the composition will not only absorb oxygen but generate carbon dioxide gas. Calcium hydroxide, sodium carbonate and sodium bicarbonate are preferred to the rest of the above examples.

Favorable examples of the sulfite to be contained in the composition of the invention are sodium sulfite, potassium sulfite, calcium sulfite, zinc sulfite, barium sulfite, and manganese sulfite, which may all be anhydrous or hydrated. Sodium sulfite 7-hydrate $Na_2SO_3 \cdot 7H_2O$ is most favorable.

Use of calcium chloride and magnesium chloride is favorable as a deliquescent substance herein above in the light of degree of deliquescency, safety and handling.

It is preferred that activated zeolite, bentonite, activated clay, activated alumina or any other like adsorbent be added in order to retain water required for the reaction. Any of these adsorbents impart a deodorant ability to the freshness keeping agent. When the composition includes a deliquescent substance, the adsorbents can serve to adjust a degree of deliquescency of that substance.

There is no specific limitation imposed on ratios of the above stated components in the composition, but the latter can be optionally selected in dependence on kind of foodstuffs to be packaged. The following component ratios are generally favorable. When ascorbic acid or its salt is not used, 20 to 100 by weight parts of alkali compound, 5 to 50 by weight parts of sulfite or deliquescent substance or mixtures thereof, 0 to 10 by weight parts of adsorbent, and 0 to 70 by weight parts of iron powder are combined therewith all relative to 100 by weight parts of the sulfate or chloride of iron(II), etc. When ascorbic acid or its salt is used in combination, 200 to 500 by weight parts of the ascorbic acid or its salt is added relative to 100 by weight parts of the sulfate or chloride of iron(II), etc. as typically used, and relative to 100 by weight of parts a mixture of the two components used are 60 to 250 by weight parts of alkali compound, 20 to 80 by weight parts of sodium sulfite or deliquescent substance, 30 to 80 by weight parts of adsorbent and 0 to 80 by weight parts of iron powder.

An oxygen-absorbing reaction of the foodstuff freshness keeping agent of the invention will be described. Water required for the oxygen-absorbing reaction need not be supplied from outside. Water is generated by reaction of the sulfite and the sulfate or chloride as typically used, or water retained in the package by the deliquescent substance may be used to this end. In a typical composition containing iron(II) sulfate and sodium sulfite, for example, water is released by the following reaction:

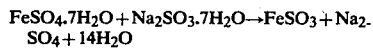

A deliquescent substance, when contained in the composition, serves to adsorb water naturally existing in the interior atmosphere of package and/or generated by the above noted reaction, thus suppressing diffusion of water, and further to retain an excess of water, preventing the packaged foodstuffs, particularly dried foodstuffs, from being wetted.

The sulfite and the deliquescent substance may be used alternatively, or both in combination as above suggested. No limitation is imposed on a ratio between the two when used in combination, but preferably, 0.25 to 6 by weight parts of the deliquescent substance are to be added relative to 1 by weight part of the sulfite.

Using water supplied as above stated, the sulfate or chloride and the alkali compound react with each other and thereby absorb oxygen in the package, which reaction may be expressed by way of example in the following reaction formula: where a deliquescent substance is used;

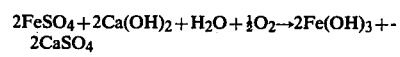

and where a sulfite is used;

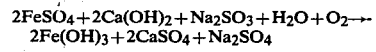

where a carbonate or a bicarbonate is used instead of hydroxide, generation of carbon dioxide gas as well as absorption of oxygen takes place in a manner as expressed by way of example in the following reaction formula:

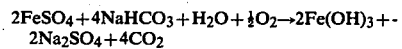

Hydroxide, bicarbonate and carbonate may be used in combination, without any limitation on a ratio therebetween.

Compositions containing iron powder can absorb oxygen by the virtue of reaction of the iron powder under the existance of alkali as follows:

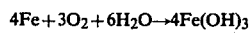

Ascorbic acid or its salt serves to absorb oxygen in a manner which may be expressed by way of example as follows:

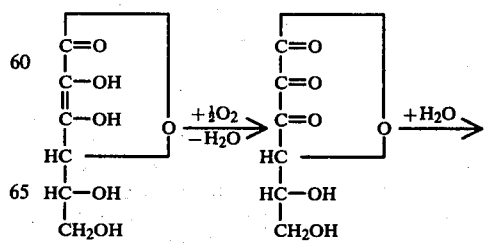

-continued

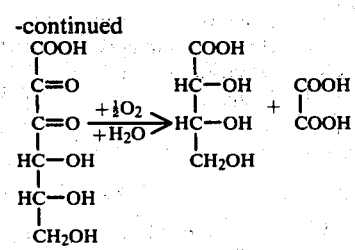

thus permitting a long-time storage of the vegetables or the like with freshness kept.

It is thus apparent that foodstuffs to which the foodstuff freshness keeping agent of this invention can be applied include war meat, cattle or fish, and vegetable and fruit, as well as bread, cake, ham, cheese, butter and any other like processed foodstuffs.

Table 1 below shows typical examples of the compositions of the foodstuff freshness keeping agent of the invention.

TABLE 1

| Component | Foodstuff freshness keeping agent | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| FeSO$_4$.7H$_2$O | 65 | | 8 | 8 | 65 | 65 | | 11 | 11 | 65 | | 65 | 40 | 40 | 40 | 40 | 40 | 40 | 7 | 7 | 6 | 6 | 50 | 50 | 50 | 50 | 50 | 50 |
| MnSO$_4$.7H$_2$O | | 75 | | | | | 75 | | | | 75 | | | | | | | | | | | | | | | | | |
| L-ascorbic acid | | | 24 | | | | | 21 | | | | | | | | | 20 | | 18 | | | | | | | | | |
| Sodium L-ascorbate | | | | 24 | | | | | 21 | | | | | | | | | 20 | | 18 | | | | | | | | |
| Ca(OH)$_2$ | 15 | 15 | 24 | 24 | | 15 | 15 | | | 15 | 15 | | 10 | | 10 | | 10 | | 20 | 20 | | | 4 | 4 | 4 | | | |
| NaHCO$_3$ | | | | | 25 | | | 21 | 21 | | | 25 | | 25 | | 25 | | 25 | | | 18 | 18 | 12 | 12 | 12 | 12 | 12 | 12 |
| Na$_2$CO$_3$.10H$_2$O | | | | | | | | 21 | 21 | | | | | | | | | | | | 18 | 18 | | | | 12 | 12 | 12 |
| Na$_2$SO$_3$.7H$_2$O | 7 | 7 | 24 | 24 | 7 | | | | | 7 | 7 | 7 | 7 | 7 | | 7 | 7 | 20 | 20 | | | 7 | | 7 | 7 | | 7 |
| CaCl$_2$.2H$_2$O | | | | | | 10 | 10 | 8 | 8 | 10 | 10 | 10 | | | 10 | 10 | 10 | 10 | | | 9 | 9 | | 10 | 10 | | 10 | 10 |
| Activated charcoal | 2 | 2 | 20 | 20 | 2 | 2 | 2 | 18 | 18 | 2 | 2 | 2 | 2 | 2 | 2 | 2 | 2 | 2 | 17 | 17 | 15 | 15 | 2 | 2 | 2 | 2 | 2 | 2 |
| Iron powder | | | | | | | | | | | | | 26 | 26 | 26 | 26 | 26 | 26 | 16 | 16 | 15 | 15 | | | | | | |

While the typical examples of components are designated in the foregoing reaction formulae with reference to which the various reactions of the compositions of the invention have been described, any other kinds of the related components can as well perform similar reactions.

The freshness keeping agent of the invention is constituted by a particulate composition of the above described components. In use, a foodstuff freshness keeping agent of the invention is encased in an air- and water-pervious receptacle to be kept from direct contact with foodstuffs in a package. For example, the particulate composition is encased in a pouch made of a laminated film of paper and perforated polyethylene film. The word "perforated" herein used is intented to mean that packaging material is porous so as to be pervious to gas and water. The encased composition is packed in a package together with a foodstuff. Thus, the foodstuff freshness keeping agent functions to absorb oxygen in the interior of the foodstuff package and/or generate carbon dioxide gas, thereby permitting a long-time storage of the foodstuffs with inhibiting oxidation and discoloration, and proliferation of microorganisms therein. When the composition is applied to vegetables or like foodstuffs, their respiratory action is thereby inhibited, Some of the agents shown in Table 1 were subjected to tests for the purpose of evaluating capability of elimination of oxygen and of generation of carbon dioxide gas. In the tests, 5.0 g samples of each of the agents were sealed respectively, together with 400 cc of air, in a 150 mm by 200 mm pouch made of a laminate of vinylidene chloride-coated polypropylene film (22μ) and polyethylene film (50μ). Variation of concentrations of oxygen and carbon dioxide gas in the pouch with the lapse of time was measured by gas chromatography. The results are shown in Table 2.

TABLE 2

| Gas concentration (%) | Foodstuff freshness keeping agent used | | | | | | | | | | | | | |
|---|---|---|---|---|---|---|---|---|---|---|---|---|---|---|
| | 1 | 2 | 3 | 4 | 5 | 10 | 13 | 15 | 16 | 19 | 23 | 25 | 27 | 28 |
| O$_2$ 6 hours after | 7.8 | 9.8 | 7.9 | 7.6 | 8.3 | 7.4 | 7.7 | 7.6 | 10.8 | 8.7 | 7.9 | 7.9 | 8.3 | 7.6 |
| CO$_2$ | <0.1 | <0.1 | <0.1 | <0.1 | 8.0 | <0.1 | <0.1 | <0.1 | 5.7 | <0.1 | 7.6 | 8.0 | 7.6 | 8.1 |
| O$_2$ 12 hours after | 2.1 | 4.3 | 2.4 | 2.3 | 3.8 | 2.1 | 2.6 | 2.5 | 5.2 | 2.6 | 2.8 | 2.4 | 2.7 | 2.2 |
| CO$_2$ | <0.1 | <0.1 | <0.1 | <0.1 | 11.2 | <0.1 | <0.1 | <0.1 | 9.7 | <0.1 | 11.6 | 12.6 | 11.0 | 12.3 |
| O$_2$ 18 hours after | <0.1 | 1.8 | <0.1 | 1.2 | 1.5 | 0.5 | 1.1 | 1.1 | 2.0 | 1.1 | 1.2 | 1.0 | 1.4 | 1.1 |
| CO$_2$ | <0.1 | <0.1 | <0.1 | <0.1 | 0.8 | <0.1 | <0.1 | <0.1 | 17.4 | <0.1 | 18.3 | 18.8 | 17.9 | 18.6 |
| O$_2$ 24 hours after | <0.1 | 0.1 | <0.1 | <0.1 | <0.1 | <0.1 | <0.1 | <0.1 | 0.5 | <0.1 | 0.1 | <0.1 | 0.1 | 0.1 |
| CO$_2$ | <0.1 | <0.1 | <0.1 | <0.1 | 20.2 | <0.1 | <0.1 | <0.1 | 20.1 | <0.1 | 21.2 | 20.3 | 21.0 | 20.7 |

As shown in Table 2, all the freshness keeping agents could reduce the oxygen concentrations in the pouches to less than 1% after the lapse of 24 hours. Freshness keeping agents Nos. 5, 16, 23, 25, 27, and 28 which each contain NaHCO$_3$ or Na$_2$CO$_3$.10H$_2$O were found to increase the corresponding concentration of carbon dioxide gas to about 20% after the lapse of 24 hours.

Examples will be given below where freshness keeping agents of the invention were applied in genuine foodstuff packages.

EXAMPLE 1

Use was made of freshness keeping agents of compositions shown in Table 3 below.

TABLE 3

| Components | Freshness keeping agent | | | |
|---|---|---|---|---|
| | 29 | 30 | 31 | 32 |
| Iron(II) sulfate ($FeSO_4.7H_2O$) | 3.7 | — | 3.3 | 3.5 |
| Manganese(II) sulfate ($MnSO_4.7H_2O$) | — | 3.8 | — | — |
| Calcium hydroxide ($Ca(OH)_2$) | 0.8 | 0.8 | — | 0.8 |
| Sodium bicarbonate ($NaHCO_3$) | — | — | 1.2 | — |
| Sodium sulfite ($Na_2SO_3.7H_2O$) | 0.4 | 0.4 | 0.4 | — |
| Calcium chloride ($CaCl_2.2H_2O$) | — | — | — | 0.6 |
| Activated charcoal | 0.1 | 0.1 | 0.1 | 0.1 |

Freshness keeping agents of 5 g of the above compositions were each charged in a 50 mm by 60 mm pouch made of a laminate of Japanese paper (40 g/m²), perforated polyethylene film (15μ), special non-woven fabric (19 g/m²) and perforated polyethylene film (30μ). The special non-woven fabric in the laminate is formed by a mesh web of filaments provided by cutting a flat oriented film. The same special non-woven fabric was used in other Examples below.

Each of the charged pouches was packaged together with a about 300 g loaf of bread in a vinylidene chloride-coated oriented polypropylene film (22μ)/polypropylene film (40μ) bag (150 mm×200 mm), where generation of mold fungi was observed and variation of concentrations of oxygen and carbon dioxide was measured with the lapse of time at a temperature of 250° C. The results are shown in Table 4.

TABLE 4

| Item | | interior gas concentration (%) | | | | generation of fungi* | | | |
|---|---|---|---|---|---|---|---|---|---|
| Lapse of time | | 1 day | 7 days | 14 days | 28 days | 1 day | 7 days | 14 days | 28 days |
| Agent 29 | $O_2$ | 0.05 | 0.01 | 0.01 | 0.01 | — | — | — | — |
| | $CO_2$ | 0.00 | 0.00 | 0.00 | 0.00 | | | | |
| Agent 30 | $O_2$ | 0.11 | 0.01 | 0.01 | 0.01 | — | — | — | — |
| | $CO_2$ | 0.00 | 0.00 | 0.00 | 0.00 | | | | |
| Agent 31 | $O_2$ | 0.10 | 0.01 | 0.01 | 0.01 | — | — | — | — |
| | $CO_2$ | 20.7 | 20.7 | 20.9 | 20.8 | | | | |
| Agent 32 | $O_2$ | 0.03 | 0.01 | 0.01 | 0.01 | — | — | — | — |
| | $CO_2$ | 0.00 | 0.00 | 0.00 | 0.00 | | | | |
| Blank** | $O_2$ | 19.7 | 17.6 | — | — | — | + | + | + |
| | $CO_2$ | 1.20 | 13.2 | — | — | | | | |
| $N_2$ gas 100% substitution | $O_2$ | 0.40 | 0.77 | 1.27 | 2.10 | — | — | + | + |
| | $CO_2$ | 0.01 | 1.02 | 2.02 | 6.76 | | | | |

*+ ... fungi generated; — ... fungi not generated
**package holding air without any freshness keeping agent As apparent from Table 4, mold fungi were not observed to be generated in the packages according to the invention until after 28 days at a temperature of 25° C. In contradistinction to the favorable results, generation of mold fungi was observed in the gas packaging ($N_2$ substituted) and Blank (air holding) after the lapse of 14 and 7 days, respectively, thus obviously presenting incapability of keeping freshness of the loaf of bread. It was found that the cellular structure of bread packaged with the agents 29, 30 and 32 where oxygen was merely absorbed had been in part collapsed to result in an unsatisfactory appearance. The bread loaf packaged with the agent 31 where carbon dioxide gas was substituted for absorbed oxygen was found to remain in a substantially same appearance as when the loaf had been packaged.

EXAMPLE 2

Use was made of freshness agents of compositions shown in Table 5.

TABLE 5

| Components | Freshness keeping agent | | | |
|---|---|---|---|---|
| | 29 | 31 | 33 | 34 |
| Iron(II) sulfate ($FeSO_4.7H_2O$) | 3.7 | 3.3 | 2.4 | 2.0 |
| Calcium hydroxide ($Ca(OH)_2$) | 0.8 | — | 0.6 | — |
| Sodium bicarbonate ($NaHCO_3$) | — | 1.2 | — | 1.2 |
| Sodium sulfate ($Na_2SO_3.7H_2O$) | 0.4 | 0.4 | 0.4 | 0.5 |
| Activated charcoal (C) | 0.1 | 0.1 | 0.1 | 0.1 |
| Iron powder (Fe) | — | — | 1.5 | 1.3 |

Freshness keeping agent samples of 5 g of the above compositions were each charged in a 50 mm by 60 mm pouch made of a laminate of glassine paper (30 g/m²), perforated polyethylene film (15μ), reinforcement (19 g/m²) and perforated ethylene-vinyl acetate copolymer film (40μ).

Each of the charged pouches was packaged together with a 100 mm by 170 mm by 60 mm piece of sponge-cake in a 200 mm by 350 mm bag made of laminate of vinylidene chloride-coated oriented polypropylene film (22μ) and polyethylene film (40μ), where generation of mold fungi was observed and variation of concentrations of oxygen and carbon dioxide gas was measured with the lapse of time at a temperature of 25° C. The results are shown in Table 6.

TABLE 6

| Item | | Interior gas concentration (%) | | | | | Generation of fungi* | | | | | Appearance, taste, etc. |
|---|---|---|---|---|---|---|---|---|---|---|---|---|
| Lapse of time | | 1 day | 7 days | 14 days | 28 days | 35 days | 1 day | 7 days | 14 days | 28 days | 35 days | 35 days |
| Agent 29 | $O_2$ | 0.07 | 0.08 | 0.06 | 0.01 | 0.01 | — | — | — | — | — | cake slightly deformed |
| | $CO_2$ | 0.00 | 0.00 | 0.00 | 0.00 | 0.00 | | | | | | good taste |
| Agent 31 | $O_2$ | 0.10 | 0.09 | 0.05 | 0.02 | 0.01 | — | — | — | — | — | good in appearance and taste |
| | $CO_2$ | 20.1 | 19.9 | 20.0 | 20.0 | 20.1 | | | | | | |
| Agent 33 | $O_2$ | 0.02 | 0.01 | 0.01 | 0.01 | 0.01 | — | — | — | — | — | cake slightly |

TABLE 6-continued

| Item Lapse of time | | Interior gas concentration (%) | | | | | Generation of fungi* | | | | | Appearance, taste, etc. |
|---|---|---|---|---|---|---|---|---|---|---|---|---|
| | | 1 day | 7 days | 14 days | 28 days | 35 days | 1 day | 7 days | 14 days | 28 days | 35 days | 35 days |
| Agent 34 | CO₂ | 0.00 | 0.00 | 0.00 | 0.00 | 0.00 | − | − | − | − | − | deformed good in appearance and taste |
| | O₂ | 0.09 | 0.02 | 0.01 | 0.01 | 0.01 | | | | | | |
| Blank | CO₂ | 20.8 | 20.9 | 20.7 | 20.7 | 20.7 | − | + | + | + | + | inedible |
| | O₂ | 19.8 | 18.0 | 16.5 | 16.2 | — | | | | | | |
| N₂ gas 100% substitution | CO₂ | 1.00 | 12.6 | 16.7 | 29.2 | — | − | − | − | + | + | inedible |
| | O₂ | 0.05 | 0.42 | 0.40 | 0.40 | 0.40 | | | | | | |
| CO₂ gas 100% substitution | CO₂ | 0.01 | 0.12 | 0.92 | 2.94 | 3.56 | − | − | − | − | − | change in taste (with sour taste and odor) |
| | O₂ | 0.70 | 0.62 | 0.61 | 0.57 | 0.64 | | | | | | |
| | CO₂ | 99.0 | 98.6 | 98.1 | 95.2 | 92.6 | | | | | | |

*+ ... mold fungi generated; − ... mold fungi not generated

As apparent from Table 6, freshness keeping agents 29, 31, 33 and 34 were found to be as satisfactory in antifungal capability as the carbon dioxide gas 100% substituted packaging, and to preserve good taste in contradistinction to the CO₂ gas substituted packaging which admitted of problems of generation of sour taste and odor. It was noted that freshness keeping agents 31 or 34, among others, which is capable of generating carbon dioxide gas was favorable in application to sponge-cake in that the food product could be therby kept free of collapse of the cellular structure and deformation of the appearance.

EXAMPLE 3

Use was made of freshness keeping agents of compositions shown in Table 7.

Freshness keeping agent samples of 5 g of the above compositions were each charged in a same manner as in Example 2.

The charged agents were hermetically packaged together with 200 g of peanut butter in two kinds of bags A made of a laminate of vinylidene chloride-coated oriented polypropylene film (22μ) and polypropylene film (22μ) and polyethylene film (40μ) and B made of a laminate of polyamide film (15μ) and polyethylene (40μ), both having a size of 150 mm by 200 mm, where oxidation of fat contained in the peanut butter were measured in terms of peroxide value with the lapse of time at a temperature of 25° C. The results are shown in Table 8.

TABLE 8

| Item Lapse of time | Interior oxygen concentration (%) | | | | Peroxide value (meq./kg) | | | |
|---|---|---|---|---|---|---|---|---|
| | 1 day | 30 days | 60 days | 90 days | 1 day | 30 days | 60 days | 90 days |
| Packaging material A | | | | | | | | |
| Agent 29 | 0.02 | 0.01 | 0.01 | 0.01 | 16 | 16 | 17 | 17 |
| Agent 35 | 0.03 | 0.01 | 0.01 | 0.01 | 16 | 16 | 16 | 17 |
| Agent 36 | 0.02 | 0.01 | 0.01 | 0.01 | 16 | 17 | 17 | 17 |
| Agent 37 | 0.04 | 0.01 | 0.01 | 0.01 | 16 | 16 | 16 | 16 |
| Agent 38 | 0.03 | 0.01 | 0.01 | 0.01 | 16 | 17 | 17 | 17 |
| Blank | 20.1 | 10.0 | 8.92 | 8.11 | 16 | 35 | 40 | 49 |
| N₂ gas 100% substitution | 0.41 | 0.50 | 0.77 | 0.76 | 16 | 19 | 22 | 26 |
| Packaging material B | | | | | | | | |
| Agent 29 | 0.05 | 0.04 | 0.04 | 0.05 | 16 | 18 | 18 | 19 |
| Agent 35 | 0.06 | 0.05 | 0.05 | 0.05 | 16 | 19 | 19 | 18 |
| Agent 36 | 0.04 | 0.04 | 0.04 | 0.04 | 16 | 18 | 18 | 19 |
| Agent 37 | 0.07 | 0.06 | 0.05 | 0.05 | 16 | 19 | 20 | 20 |
| Agent 38 | 0.05 | 0.05 | 0.04 | 0.04 | 16 | 18 | 18 | 18 |
| Blank | 20.2 | 12.4 | 9.7 | 9.4 | 16 | 41 | 47 | 57 |
| N₂ gas 100% substitution | 0.60 | 2.71 | 3.92 | 5.68 | 16 | 25 | 28 | 36 |

TABLE 7

| Components | Freshness keeping agent | | | | |
|---|---|---|---|---|---|
| | 29 | 35 | 36 | 37 | 38 |
| Iron (II) sulfate (FeSO₄.7H₂O) | 3.7 | 3.5 | 3.3 | 2.4 | 2.1 |
| Calcium hydroxide (Ca(OH)₂) | 0.8 | 0.8 | 0.8 | 0.6 | 0.5 |
| Sodium Sulfite (NaSO₃.7H₂O) | 0.4 | — | 0.4 | 0.4 | 0.4 |
| Calcium chloride (CaCl₂.2H₂O) | — | 0.6 | 0.5 | — | 0.5 |
| Activated charcoal | 0.1 | 0.1 | 0.1 | 0.1 | 0.1 |
| Iron powder | — | — | — | 1.3 | 1.4 |

As apparent from Table 8, almost no increase of the peroxide value was detected in case of the freshness keeping agent after the lapse of about 3 months, presenting an enhanced preserving capability in comparison with the N₂ gas substituted packaging. It should be noted that the difference of packaging material had a smaller effect on the packages holding the agents of the invention than on the $N_2$ gas substituted packaging, so that the former can present a satisfactory preserving effect when held in packaging material of a relatively low gas-barrier.

EXAMPLE 4

Use was made of freshness keeping agents of compositions shown in Table 9.

in a 200 mm by 300 mm bag made of polyethylene film (60μ), with the openings hermetically closed by an adhesive cellophane tape, and the conditions of de-astringent and softness of the persimmons were evaluated with the lapse of time at a temperature of 25° C. Further, freshness keeping agents of the above compositions were each packaged together with two astringent persimmons in a box-like receptacle provided by vac-

TABLE 10

| | Lapse of Time | | | | | | | | | |
|---|---|---|---|---|---|---|---|---|---|---|
| | 1 day | | | 4 days | | | 10 days | | 15 days | |
| Item | Gas concentration (%)* | Astringency** | Hardness*** | Gas concentration (%)* | Astringency** | Hardness*** | Astringency** | Hardness*** | Astringency** | Hardness*** |
| Packaging material: Bag | | | | | | | | | | |
| Agent 29 | 3.8 / 18.0 | + | o | 8.6 / 12.5 | + | o | + | o | + | o |
| Agent 31 | 4.2 / 38.2 | + | o | 10.1 / 24.2 | − | o | − | o | − | o |
| Agent 34 | 3.9 / 41.0 | + | o | 9.3 / 24.9 | − | o | − | o | − | o |
| Agent 39 | 5.1 / 37.6 | + | o | 10.7 / 26.0 | − | o | − | o | − | o |
| Agent 40 | 5.0 / 38.5 | + | o | 11.0 / 25.0 | − | o | − | o | − | o |
| Blank | 6.6 / 12.5 | + | o | 7.8 / 10.1 | + | o | + | Δ | + | x |
| $CO_2$ gas charge | 5.5 / 58.6 | + | o | 12.9 / 5.8 | − | o | − | Δ | − | x |
| Packaging material: Box-like receptacle | | | | | | | | | | |
| Agent 29 | 2.9 / 25.5 | + | o | 3.8 / 18.0 | + | o | + | o | − | o |
| Agent 31 | 3.4 / 42.6 | + | o | 5.2 / 30.0 | − | o | − | o | − | o |
| Agent 34 | 3.0 / 47.6 | + | o | 4.1 / 30.9 | − | o | − | o | − | o |
| Agent 39 | 4.1 / 47.7 | + | o | 4.6 / 32.6 | − | o | − | o | − | o |
| Agent 40 | 4.0 / 46.0 | + | o | 5.1 / 29.5 | − | o | − | o | − | o |
| Blank | 5.8 / 13.7 | + | o | 10.0 / 13.2 | + | o | + | x | − | x |
| $CO_2$ gas substitution | 0.9 / 76.0 | + | o | 5.7 / 7.6 | − | o | − | Δ | − | x |

*Concentration of oxygen and carbon dioxide gas are indicated in the upper and the lower lines, respectively.
**+ astringent; − . . . non astringent (de-astringed)
***o . . . hard; Δ . . . comparatively soft; x . . . soft

TABLE 9

| | Freshness keeping agent | | | | |
|---|---|---|---|---|---|
| Components | 29 | 31 | 34 | 39 | 40 |
| Iron (II) sulfate ($FeSO_4.7H_2O$) | 3.7 | 3.3 | 2.0 | 3.2 | 2.7 |
| Calcium hydroxide ($Ca(OH)_2$) | 0.8 | — | — | 0.3 | — |
| Sodium bicarbonate ($NaHCO_3$) | — | 1.2 | 1.2 | 0.8 | 0.6 |
| Sodium carbonate ($Na_2CO_3.10H_2O$) | — | — | — | — | 0.6 |
| Sodium sulfite ($NaSO_3.7H_2O$) | 0.4 | 0.4 | 0.5 | — | 0.4 |
| Calcium chloride ($CaCl_2.2H_2O$) | — | — | — | 0.6 | 0.5 |
| Activated charcoal | 0.1 | 0.1 | 0.1 | 0.1 | 0.1 |
| Iron powder | — | — | 1.3 | — | — |

Freshness keeping agent samples of 5 g of the above compositions were each charged in a pouch in a similar manner as in Example 2. Each of the charged pouches was packaged together with five astringent persimmons uum molding a polyethylene sheet (200μ), with the opening hermetically closed with a lid member of polyethylene film (40μ), where the conditions of de-astringent and softness of the persimmons were evaluated with the lapse of time at a temperature of 25° C. The results are shown in Table 10.

It should be noted in Table 10 that the freshness keeping agents are effective in inhibiting persimmon and the like fruit from being softened. As apparent from Table 10, the agents 31, 34, 39 and 40 capable of generating carbon dioxide gas thereby remove astringent taste of the persimmons. It has been known that carbon dioxide gas de-astringe persimmon, but the freshness keeping agents could serve to not only de-astringe but inhibit softening of persimmons.

EXAMPLE 5

Use was made of freshness keeping agents of compositions shown in Table 11.

TABLE 11

| Components | Freshness keeping agent | | | | |
|---|---|---|---|---|---|
| | 29 | 31 | 41 | 42 | 43 |
| Iron (II) sulfate ($FeSO_4.7H_2O$) | 3.7 | 3.3 | 0.4 | 0.6 | 0.3 |
| Sodium L-ascorbate | — | — | 1.2 | 1.1 | 0.9 |
| Calcium hydroxide ($Ca(OH)_2$) | 0.8 | — | 1.2 | — | — |
| Sodium bicarbonate ($NaHCO_3$) | — | 1.2 | — | 1.1 | 0.9 |
| Sodium carbonate ($Na_2CO_3.10H_2O$) | — | — | — | 1.1 | 0.9 |
| Sodium sulfite ($Na_2SO_3.7H_2O$) | 0.4 | 0.4 | 1.2 | — | — |
| Activated charcoal | 0.1 | 0.1 | 1.0 | 0.9 | 0.8 |
| Iron powder | — | — | — | — | 0.8 |
| Calcium chloride ($CaCl_2.2H_2O$) | — | — | — | 0.4 | 0.5 |

Freshness keeping agents of 5 g of the above compositions were each charged in a pouch in a similar manner as in Example 2. The charged pouch and 200 g of a beef block were placed in a tray provided by vacuum molding a laminated sheet of cast polyamide (50μ) and cast polypropylene (500μ) and then hermetically covered with a laminated film of vinylidene chloride-coated oriented polypropylene (20μ) and cast polypropylene (50μ). Quality of the packaged raw beef while stored at a temperature of 3° C. was evaluated with the lapse of time. The results are shown in Table 12.

TABLE 12

| | Lapse of time | | | | | | | |
|---|---|---|---|---|---|---|---|---|
| | One week | | two weeks | | three weeks | | four weeks | |
| Item | Number of vital bacteria* | Edibility** | Number of vital bacteria* | Edibility** | Number of vital bacteria | Edibility** | Number of vital bacteria | Edibility** |
| Agent 29 | $2.5 \times 10^3$ | o | $1.7 \times 10^4$ | o | $4.0 \times 10^4$ | o | $5.6 \times 10^4$ | o |
| Agent 31 | $1.2 \times 10^3$ | o | $3.6 \times 10^3$ | o | $3.7 \times 10^3$ | o | $4.5 \times 10^4$ | o |
| Agent 41 | $5.7 \times 10^3$ | o | $1.0 \times 10^4$ | o | $3.2 \times 10^4$ | o | $6.2 \times 10^4$ | o |
| Agent 42 | $1.4 \times 10^3$ | o | $7.2 \times 10^3$ | o | $7.3 \times 10^3$ | o | $8.9 \times 10^3$ | o |
| Agent 43 | $1.1 \times 10^3$ | o | $5.2 \times 10^3$ | o | $5.6 \times 10^3$ | o | $7.6 \times 10^3$ | o |
| Blank | $1.7 \times 10^5$ | o | $3.6 \times 10^6$ | Δ | $9.2 \times 10^7$ | x | $1.3 \times 10^8$ | x |
| $CO_2/N_2 = 80/20$ | $9.2 \times 10^3$ | o | $4.2 \times 10^5$ | o | $9.0 \times 10^5$ | Δ | $2.6 \times 10^6$ | x |
| $N_2/CO_2 = 80/20$ | $1.5 \times 10^4$ | o | $1.6 \times 10^6$ | Δ | $4.6 \times 10^7$ | x | $8.9 \times 10^7$ | x |

*number of vital bacteria present in 1 g of raw beef
**o . . . good; Δ . . . slight putrid smell; x . . . putrefied As apparent from Table 12, the beef blocks packaged with the compositions of the invention were not modified at all after storage of four weeks.

EXAMPLE 6

Freshness keeping agent samples of 5 g of compositions 1,3,8, and 21 shown in Table 1 above were charged in a pouch in a similar manner as in Example 2. The pouch thus charged and 10 bundles of leek each wrapped with a perforated polyethylene film (40μ) were placed in a cardboard box which was then closed. While the leek thus packaged was stored at a temperature of 20° C., wilting and decay of leek were observed with the lapse of time. The results are shown in Table 13 where numbers of the leek bundles which were wilted and decayed are designated by the corresponding numbers.

TABLE 13

| | Lapse of time | | | | | | | |
|---|---|---|---|---|---|---|---|---|
| | 1 day | | 3 days | | 5 days | | 7 days | |
| Item | wilting | decay | wilting | decay | wilting | decay | wilting | decay |
| Agent 1 | 0 | 0 | 0 | 0 | 0 | 0 | 0 | 0 |

TABLE 13-continued

| | Lapse of time | | | | | | | |
|---|---|---|---|---|---|---|---|---|
| | 1 day | | 3 days | | 5 days | | 7 days | |
| Item | wilting | decay | wilting | decay | wilting | decay | wilting | decay |
| Agent 3 | 0 | 0 | 0 | 0 | 0 | 0 | 0 | 0 |
| Agent 8 | 0 | 0 | 0 | 0 | 0 | 0 | 0 | 0 |
| Agent 21 | 0 | 0 | 0 | 0 | 0 | 0 | 0 | 0 |
| Blank | 0 | 0 2 | 1 | 5 | 3 | 8 | 5 | |
| $N_2$ gas holding | 0 | 0 | 0 | 0 | 1 | 1 | 3 | 2 |

As apparent from Table 13, the freshness keeping agents of the invention were found effective in protecting vegetables against being wilted and decayed.

What we claim is:

1. A foodstuff freshness keeping agent for absorbing oxygen in a foodstuff package, comprising an air-and-water previous bag containing a composition in powdery or granular form consisting essentially of:
   100 parts by weight of a main oxidizable component consisting essentially of at least one metal salt selected from the group consisting of a sulfate and a chloride of manganese (II), iron (II), cobalt (II) and nickel (II);
   20 to 100 parts by weight of at least one alkali compound selected from the group consisting of a hydroxide, a carbonate and a bicarbonate of an alkali metal and an alkaline earth metal,
   5 to 50 parts by weight of at least one water supplying substance selected from the group consisting of sodium sulfite, potassium sulfite, calcium sulfite, zinc sulfite, barium sulfite, manganese sulfite, calcium chloride and magnesium chloride,
   0 to 10 parts by weight of an adsorbent, and
   0 to 70 parts by weight of iron powder.

2. A foodstuff freshness keeping agent for absorbing oxygen in a foodstuff package, comprising an air-and-water previous bag containing a composition in powdery or granular form consisting essentially of:
   100 parts by weight of a main oxidizable component consisting essentially of a mixture of 100 parts by weight of at least one metal salt selected from the group consisting of a sulfate and a chloride of manganese (II), iron (II), cobalt (II) and nickel (II), and of 200 to 500 parts by weight of ascorbic acid or a salt thereof,
   60 to 250 parts by weight of at least one alkaline compound selected from the group consisting of a hydroxide, a carbonate and a bicarbonate of an alkali metal and an alkaline earth metal, 20 to 80 parts by weight of at least one water supplying substance selected from the group consisting of sodium sulfite, potassium sulfite, calcium sulfite, zinc sulfite, barium sulfite, manganese sulfite, calcium chloride and magnesium chloride, 30 to 80 parts by weight of an adsorbent, and 0 to 80 parts by weight of iron powder.

3. The foodstuff freshness keeping agent of claim 1 or 2 wherein said alkali compound is selected from the group consisting of a carbonate and a bicarbonate capable of generating carbon dioxide gas.

4. The foodstuff freshness keeping agent of claim 1 or 2, wherein said metallic salt is selected from the group consisting of manganese (II) sulfate, iron (II) sulfate, cobalt (II) sulfate, nickel (II) sulfate, manganese (II) chloride, iron (II) chloride, cobalt (II) chloride, and Nickel (II) chloride.

5. The foodstuff freshness keeping agent of claim 1 or 2, wherein said alkali compound is selected from the group consisting of sodium hydroxide, potassium hydroxide, magnesium hydroxide, calcium hydroxide, zinc hydroxide, sodium carbonate and sodium bicarbonate.

6. The foodstuff freshness keeping agent of claim 1, wherein said ascorbic acid or its salt is selected from the group consisting of L-ascorbic acid, sodium L-ascorbate, D-iso-ascorbic acid and sodium D-iso-ascorbate.

7. The foodstuff freshness keeping agent of claim 1 or 2, wherein said adsorbent agent is selected from the group consisting of activated charcoal, zeolite, bentonite, activated clay, and activated alumina.

8. A method of preserving freshness of foodstuffs which comprises maintaining said foodstuffs in a closed container along with the freshness keeping agent of claims 1 or 2.

9. A closed container containing foodstuffs and an effective amount of the freshness keeping agent of claims 1 or 2 to reduce spoilage of said foodstuffs.

10. The foodstuff freshness keeping agent of claims 1 or 2, wherein said at least one water supplying substance is a deliquescent substance selected from the group consisting of calcium chloride and magnesium chloride.

* * * * *